United States Patent [19]

Schlosstein

[11] Patent Number: 4,664,737

[45] Date of Patent: May 12, 1987

[54] SYSTEM FOR REMOVABLY ATTACHING BLANKET TO COMPOSITE MATERIAL LAY-UP STRUCTURE

[75] Inventor: Hugh R. Schlosstein, Renton, Wash.

[73] Assignee: The Boeing Company, Seattle, Wash.

[21] Appl. No.: 681,222

[22] Filed: Dec. 13, 1984

[51] Int. Cl.[4] .............................................. B32B 31/00
[52] U.S. Cl. ...................................... 156/285; 156/91;
156/382; 52/4; 52/5; 428/137; 428/193;
428/447
[58] Field of Search .................................... 156/91–92,
156/285, 381–382; 52/3–5; 428/137, 193, 447

[56] References Cited

U.S. PATENT DOCUMENTS

| | | | |
|---|---|---|---|
| 2,978,806 | 4/1961 | Herbert, Jr. | 29/471.1 |
| 3,146,143 | 8/1964 | Bolesky | 156/382 |
| 3,632,730 | 1/1972 | Cotton | 264/295 |
| 3,666,600 | 5/1972 | Yoshino | 156/382 |
| 3,912,542 | 10/1975 | Hirano et al. | 156/104 |
| 4,287,015 | 9/1981 | Danner, Jr. | 156/382 |
| 4,421,581 | 12/1983 | Olsen | 156/71 |
| 4,538,385 | 9/1985 | Kandarian | 52/3 |

Primary Examiner—Donald E. Czaja
Assistant Examiner—Merrell C. Cashion, Jr.
Attorney, Agent, or Firm—Joan H. Pauly

[57] ABSTRACT

Improvements in securing a blanket in place in vacuum bagging and like operations. Known systems for securing the blanket are cumbersome and time consuming and do not allow sufficient adjustment of the tension on the blanket. The system of the invention allows quick and easy attaching and detaching of the blanket, allows a wide range of adjustment of the tension, and does not require accurate alignment of the blanket. A strip (32) of net material is attached to a blanket (30) around the periphery of the blanket (30). A plurality of horizontally spaced pins (20) are secured to a lay-up structure (2) and positioned to extend downwardly and outwardly. The blanket (30) is placed over the structure (2) with the net (32) hanging down around pins (20). Net (32) is pulled over the free ends (22) of pins (20) to extend free ends (22) through holes (38) formed by the net structure. Tension may be adjusted by extending pins (20) through different holes (38).

19 Claims, 5 Drawing Figures

SYSTEM FOR REMOVABLY ATTACHING BLANKET TO COMPOSITE MATERIAL LAY-UP STRUCTURE

TECHNICAL FIELD

This invention relates to apparatus and methods for attaching blankets to composite material lay-up structures and, more particularly, to such a method and apparatus in which the blanket is removably and adjustably attached by hooking a net secured to the blanket onto pins carried by the structure.

BACKGROUND ART

In the laying up of laminates of composite material, it is usually necessary to stop after each several layers, or sometimes after each layer, and compact the material. This is required in order to remove air pockets and to force the layers to conform to the mold surface on which they have been laid. When the lay-up has been completed, it is normally cured at an elevated pressure and temperature in an autoclave. The current practice is to employ a reusable silicone rubber blanket in both the compacting and the curing of the laminate. The blanket is stretched over a seal that surrounds the area of the lay-up structure on which the laminate is being laid up, and a vacuum is applied inside the seal between the blanket and the lay-up surface. During compaction, the vacuum causes the blanket to exert pressure on the layers of the laminate to compact the layers. During the curing cycle, the autoclave is pressurized to increase the force on the layers of the laminate.

The need for carrying out repeated compacting steps adds to the time and labor necessary to form a laminate component. The increased time and effort required tends to make composite material components relatively expensive to manufacture. Therefore, it is highly desirable to carry out the compacting steps as quickly and easily as possible in order to minimize the cost of the operation. One step of the compacting procedure that has been cumbersome and time consuming using known techniques is the attaching of the blanket to the lay-up structure to ensure that it is and remains positioned properly with respect to the seal and the laminate during the rest of the compacting procedure.

In a possible scheme for removably attaching the blanket, a number of metal grommets are bonded to the rubber blanket at spaced intervals around the edge of the blanket. An anchor screw bracket attached to the lay-up structure is provided for each of the grommets. Experiments have shown this scheme to have a number of disadvantages. The attaching of the blanket is time consuming because of the need to align the anchor screws with the grommets when the blanket is laid over the work surface. There is a concentration of stress on the blanket around each of the grommets, and therefore, the useful life of the blanket is likely to be shortened. The need to replace the blanket more often would further add to the cost of the manufacture of the composite material components. In addition, there is no provision for adjusting the tension on the blanket to compensate for shrinkage or stretching of the blanket and avoid premature replacement of the blanket.

Another scheme that has been tried is to attach a material such as the material sold under the trademark Velcro to the edges of the blanket and to the structure outside the periphery of the seal. This method has proved inadequate because the Velcro material cannot tolerate high autoclave temperatures and fails after a few cycles and because the rigidity of Velcro material tape is incompatible with flexible rubber blankets. Zippers have also been tried, but proved inadequate when there was shrinkage of the rubber blanket due to high temperatures. Still another method that has been tried is to use a "picture frame" with the rubber blanket stretched over or under it. This technique works on small, relatively flat parts, but becomes very unwieldly for large parts and parts with extreme contours.

Each of the following United States patents discloses a vacuum bagging or other process in which a flexible sheet is urged against a workpiece by applying a vacuum: U.S. Pat. No. 2,978,806, granted Apr. 11, 1961, to T. A. Herbert, Jr.; U.S. Pat. No. 3,666,600, granted May 30, 1972, to S. Y. Yoshino; U.S. Pat. No. 3,912,542, granted Oct. 14, 1975, to J. Hirano et al; and U.S. Pat. No. 4,287,015, granted Sept. 1, 1981, to H. J. Danner, Jr. Herbert discloses a flexible sheet that is looped around its edges. Cylindrical weights are received into the loops formed by the flexible sheet and hang down over the edges of the work surface to apply tension to the flexible sheet. Yoshino does not discuss the attaching of the flexible sheet to the mold structure. However, it appears that the sheet simply adheres to the zinc chromate putty seal. In the Hirano et al method, the edges of the sheet are held down by a rectangular frame which is clamped to the work table. Danner discloses attaching the flexible cover sheet with reusable fasteners, such as a zipper, clamps, or Velcro.

U.S. Pat. No. 3,632,730, granted Jan. 4, 1972, to J. E. Cotton discloses a process in which separate sections of a semi-tubular flume are formed together in a nested configuration over a domed mold. A number of laterally spaced straps are placed over the layers of reinforced cement to be formed. A lever arrangement tightens the straps by winding the ends of the straps about a shaft positioned under the mold.

The patents described above, together with the prior art cited in the patents, should be carefully considered for the purpose of putting the present invention into proper perspective relative to the prior art.

DISCLOSURE OF THE INVENTION

A subject of the invention is attaching means for removably securing a flexible blanket over a work surface on an essentially rigid structure in a system in which a pressure differential is created to urge the blanket against a workpiece positioned on such surface. According to an aspect of the invention, the attaching means comprises a strip of flexible sheet-like material secured to the blanket around the periphery of the blanket. This material has a multiplicity of holes extending therethrough. The attaching means also includes a plurality of pins secured to the structure. The pins are positioned to engage the holes to removably secure the blanket in position over the work surface. Preferably, the holes and the pins are positioned to allow each of the pins to engage any one of a plurality of the holes to in turn allow tension on the blanket to be adjusted. In the preferred embodiment, the strip of material comprises a strip of net-like material. Such a material has the advantages of being relatively easy and inexpensive to manufacture and of providing maximized adjustability of the blanket tension and tolerance in blanket alignment.

The material is preferably secured to the blanket by adhesive means. For example, the blanket may comprise silicone rubber, and the adhesive means may comprise a silicone rubber adhesive. The adhesive means may be applied in a number of ways. In the preferred embodiment, the adhesive means comprises two layers of adhesive around the periphery of the blanket adjacent to the edges of the blanket. An edge portion of the material is secured between the two layers of adhesive. One of the layers of adhesive is wider than the other to reduce stresses on the blanket adjacent to the layers of adhesive.

Another subject of the invention is a combination of an essentially rigid structure including a work surface, a flexible blanket, pressure means, and the improvement comprising attaching means. The pressure means creates a pressure differential from one side of the blanket to the other to urge the blanket against a workpiece positioned on the work surface. The attaching means removably secures the blanket in position over the work surface. The attaching means includes a strip of flexible sheet-like material secured to the blanket around the periphery of the blanket. This material has a multiplicity of holes extending therethrough. A plurality of pins is secured to the structure. These pins are positioned to engage the holes to removably secure the blanket over the work surface. Preferably, the pressure means includes a seal carried by the structure surrounding the work surface, and the blanket is dimensioned to cover the surface and engage the seal.

Still another subject of the invention is a method of removably securing a flexible blanket in position over a work surface on an essentially rigid structure in a system in which a pressure differential is created to urge the blanket against a workpiece positioned on such surface. According to an aspect of the invention, the method comprises securing a strip of flexible sheet-like material having a multiplicity of holes extending therethrough to the blanket around the periphery of the blanket. One end of each of a plurality of pins is secured to the structure, and the pins are positioned to engage the holes. The blanket is placed over the work surface. The material is pulled over the other end of each pin to extend said other end through one of the holes to removably secure the blanket over the work surface. If desired, the method may further comprise adjusting the tension on the blanket by sliding the material off of at least some of the pins, and then extending such other end of each pin from which the material has been removed through a different one of the holes.

The system of the invention provides efficient and reliable means for removably attaching a blanket to a lay-up structure. The method and apparatus of the invention have a number of advantages, including the avoidance of the problems discussed above. In the system of the invention, the blanket may be attached and detached quickly and easily as many times as necessary to complete the fabrication of the composite material component. The method and apparatus of the invention are very flexible and readily lend themselves to use in the fabrication of components of virtually all sizes and shapes. The apparatus of the invention is very simple in structure and very inexpensive to acquire and maintain. In addition, the ease and speed with which the attaching and detaching may be accomplished decreases the labor costs associated with the fabrication process. By use of the system of the invention, the blanket may easily be pulled down into uniform contact with a seal on the lay-up structure surrounding the component being fabricated. This helps ensure that the compacting and curing operations are carried out properly. When the autoclave is pressurized prior to the curing procedure, the system of the invention prevents the inrush of air from lifting the blanket. Such a lifting of the blanket would be undesirable because it would tend to damage the component during the curing cycle.

The configuration of the blanket and the material secured thereto also has a number of advantages. One such advantage is that the blanket may easily be removed and placed into storage when not in use. In addition, the feature of adhesively attaching the material to the blanket minimizes any abrasion of the blanket and stress concentration on the blanket. The result is a maximized useful life for the blanket. The feature of adjustability of the tension on the blanket makes it possible to easily compensate for any shrinkage or stretching of the blanket. This in turn makes it possible to accurately control the compacting and curing procedures to maintain the quality of the finished component. It also eliminates any need for replacing a blanket that is still entirely functional but has shrunk or stretched.

These and other advantages and features will become apparent from the detailed description of the best mode for carrying out the invention that follows.

BRIEF DESCRIPTION OF THE DRAWINGS

In the drawings, like element designations refer to like parts throughout, and.

BEST MODE FOR CARRYING OUT THE INVENTION

Figure 3:
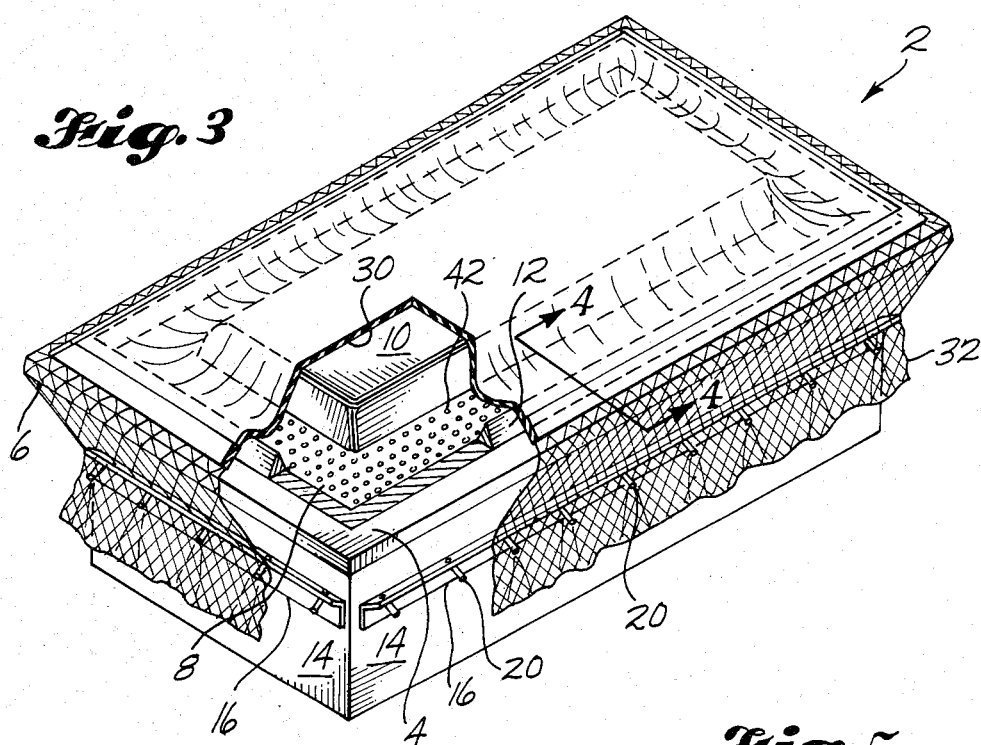
FIG. 3 is a pictorial view of a lay-up structure into which the preferred embodiment of the apparatus has been incorporated, with the blanket shown attached to the structure and a portion of the blanket cut away to reveal other portions of the system.
Figure 4:
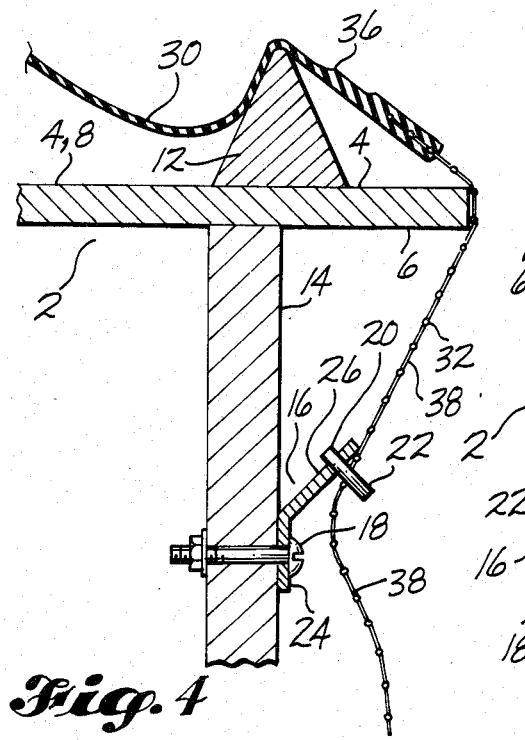
FIG. 4 is a sectional view taken along the line 4—4 in FIG. 3.
Figure 5:
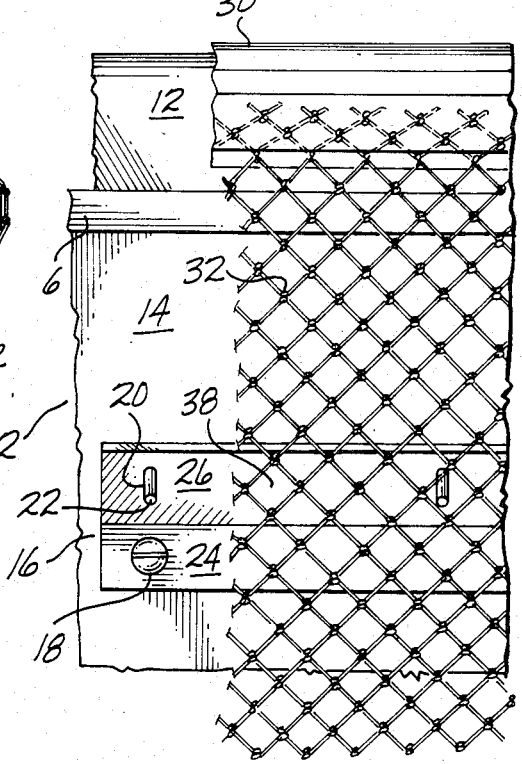
FIG. 5 is an elevational view of one of the sides of the structure shown in FIG. 3, but showing the net material pulled down ready to be hooked onto one of the pins, and with part of the net material and the blanket cut away to reveal the lay-up structure.

The drawings show attaching means that is constructed according to the invention and that also constitutes the best mode of the apparatus of the invention currently known to the applicant. The attaching means shown in the drawings is also the preferred means for practicing the best mode of the method of the invention currently known to the applicant. FIGS. 3-5 illustrate the attaching means in use in connection with a particular lay-up structure 2. The lay-up structure 2 shown in the drawings is illustrated and described herein for the purpose of providing an example of a structure in connection with which the method and apparatus of the invention may be used to great advantage. It is of course to be understood that such method and apparatus may also be used to advantage with other types of structures on which the flexible blanket is employed to exert pressure on a workpiece.

The structure 2 shown in FIGS. 3–5 includes a table-like top 4 which forms a horizontal overhanging lip 6 around its periphery. A work surface 8 is located in the middle of the top 4. The work surface 8 includes a mold 10 against which layers of composite material are formed. A seal 12 is permanently secured to the top 4 and surrounds the work surface 8. The seal 12 may take a variety of forms but is preferably of the known pyramid type shown in FIGS. 3 and 4.

The rectangular structure 2 has four vertical sides 14 extending downwardly from the table-like top 4 inside the lip 6. Each side 14 has a horizontally extending bracket 16 attached thereto and spaced downwardly from top 4. The brackets 16 may be attached by any of a variety of means, such as the screw fasteners 18 shown in FIGS. 4 and 5. As is best shown in FIGS. 3 and 4, each bracket 16 has a vertical portion 24 which abuts the corresponding vertical side 14 of the structure 2 and through which the fastener 18 extends. Each bracket 16 also includes an angled portion 26 that extends upwardly and outwardly from the top edge of the vertical portion 24.

The brackets 16 provide a means for securing the pins 20 of the attaching means of the invention to the structure 2. The angled portion 26 of each bracket 16 has a plurality of horizontally spaced holes extending therethrough for receiving the pins 20. One end of a pin 20 is received into each of the holes in the angled portion 26 and is secured therein against displacement relative to the angled portion 26. The other free end 22 of each pin 20 extends downwardly and outwardly from its corresponding angled portion 26 is a direction generally perpendicular to the angled portion 26. The pins 20 are spaced a few inches apart and are close enough to each other to provide essentially uniform tension on the blanket 30.

In the preferred embodiment, each side 14 of structure 2 has a bracket 16 and pins 20 for removably attaching the blanket 30. This arrangement allows the blanket 30 to be completely removed from the structure 2 for storage. A possible variation of the preferred arrangement consistent with the scope of the invention is permanently attaching the blanket to one side 14 of the structure 2. In this variation, the blanket 30 could be rolled up and stored adjacent to such side 14.

The attaching means and the method of the invention are intended to be used in a system in which a flexible blanket exerts pressure on a workpiece positioned on a work surface. When a pressure differential is created from one side of the blanket to the other, such as by applying a vacuum between the blanket and the work surface inside a seal, the blanket is urged against the workpiece. This is done during a compacting, curing, or similar operation. In the system shown in the drawings, the flexible blanket 30 is dimensioned to cover the work surface 8 and sealingly engage the pyramid seal 12. The blanket 30 is of a known type and is preferably made from silicone rubber.

The apparatus of the invention includes attaching means for removably securing the blanket 30 in position over the work surface 8 of the lay-up structure 2. This attaching means includes a flexible sheet-like material that is secured to the blanket 30 around the periphery of the blanket 30 adjacent to the edges of the blanket 30. The material has a multiplicity of holes extending therethrough. In the preferred embodiment shown in the drawings, the material is in the form of a net 32. The holes 38 formed by the structure of the net 32 are sized to allow the pins 20 secured to the structure 2 to be slid into the holes 38 to secure the blanket 30 to the structure 2. The net structure of the material 32 makes it possible to slide the free end 22 of each pin 20 through any one of a number of holes 38 to secure the blanket 30 to the structure 2 and obtain a desired degree of tension on the blanket 30. This can be done easily without any need to accurately align the blanket to align the pins 20 with the holes 38.

The strip of net material 32 may be made from a variety of materials and may be knotted like a fish net or woven. One material suitable for use in forming the net 32 when the net 32 will not be subjected to temperatures above about 250° F. is nylon. Another suitable net material is the material marketed by the Dupont Company under the trademark Nomex. This latter material has the advantage of being highly resistant to temperatures above 250° F.

The strip of net 32 may be attached to the blanket 30 by a variety of means. Preferably, the net 32 is adhesively secured to the blanket 30. In the preferred embodiment, the blanket 30 is made from silicone rubber, and the net 32 is secured to the blanket 30 by means of a silicone rubber adhesive. An example of a suitable adhesive is the silicone elastomer manufactured by the Mosites Rubber Company, Inc. and marketed under the name Mosites No. 14206 adhesive. Tapes of this adhesive is an uncured form are readily available.

Figure 1:
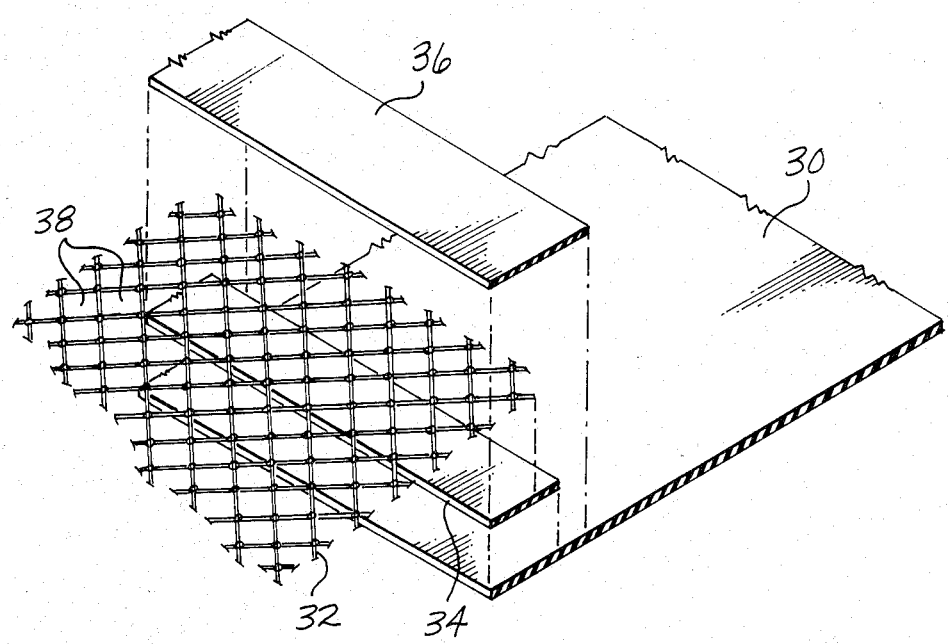
FIG. 1 is an exploded pictorial view of a portion of the blanket, net, and adhesive strips of the preferred embodiment.
Figure 2:
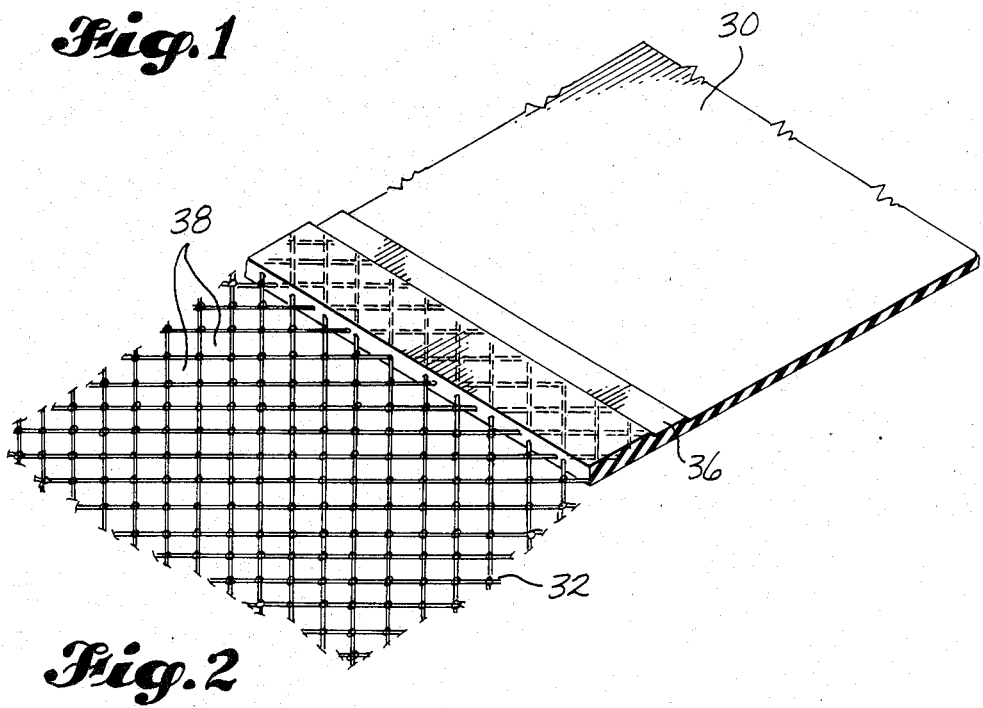
FIG. 2 is like FIG. 1 except that it shows the elements in an assembled relation.

The manner in which the net 32 is secured to the blanket 30 is illustrated in FIG. 1. The process of bonding the net 32 to the blanket 30 begins with the application of a first layer 34 of adhesive around the periphery of the blanket 30 adjacent to the edge of the blanket 30. This is easily accomplished by applying uncured adhesive around the edges of the rectangular blanket 30 from a tape of uncured adhesive having a first width. Once the first layer 34 of adhesive has been applied to the blanket 30, the inner edge portion of the net 32 is pressed against this layer 34 of adhesive to position the net 32 with respect to the blanket 30. The net 32 is preferably aligned along a bias, as shown in FIG. 2, to allow the rubber of the finished assembly to stretch and spread tension loads. Then a second layer 36 of adhesive is applied over the first layer 34 and the edge portion of the net 32. This second layer 36 is formed from a tape of uncured adhesive having a second width that is greater than the width of the tape used to form the first layer 34. After all the layers have been assembled, the blanket 30 and net 32 are vacuum bagged and placed in an autoclave to cure the adhesive 34, 36 and permanently bond the net 32 to the blanket 30. FIG. 2 illustrates the finished product.

Th use of two layers 34, 36 of adhesive reinforces the edges of the blanket 30 against tearing while permitting the edges of the blanket 30 to retain some stretchability. The provision of the adhesive in two layers 34, 36 of differing widths provides the stepped-down construction of the blanket edge 30 best seen in FIG. 4. The stepped-down configuration helps to reduce stresses on the blanket adjacent to the layers 34, 36 of adhesive by gradually changing the thickness of the blanket/adhesive assembly from its side edge toward its middle. This reduces the stresses along the inner edges of the layers 34, 36 of adhesive.

The method of the invention includes securing the net 32 to the blanket 30 and securing the pins 20 to the structure 2 in position to engage the holes 38 in the net 32. These steps need only be carried out once. Then the blanket 30 and net 32 combination is ready for use as needed.

During a normal fabrication operation, layers of composite material are laid up onto the mold 10 on the structure 2. After a certain number of layers have been laid up, with the exact number depending on the particular needs of a particular situation, the layers are compacted by a vacuum bagging operation. To prepare for the vacuum bagging, breather and bleed layers of known types may be placed over the composite material lay-up on the mold 10 as required. Then, the blanket 30 with the net 32 secured thereto is placed over the work surface 8 and the seal 12. The net 32 is allowed to hang down over the edges of the table top 4.

With the blanket 30 and net 32 in position, the net 32 is pulled down over the free end 22 of each pin 20 (see FIG. 5), and each free end 22 is slid through one of the holes 38 in the net 32 to removably secure the blanket 30 to the structure 2. The net 32 is pulled with sufficient force to obtain a desired degree of tension and then is slipped onto the pins 20. After slipping the net 32 onto a pin 20, the net 32 is released and the tension in the net 32 pulls upwardly on the net 32 to urge it against the lower circumferential surface of the pin 20. This secures the net 32 in place until a downward force is exerted on the net 32 and the net 32 is pulled downwardly and outwardly to release it from the pins 20. In this manner, the blanket 30 may be securely attached and detached from the structure 2 any number of times required by the fabrication process.

On some occasions, it might be discovered during the attaching process or at the end thereof that the tension on the blanket 30 is either greater or less than the desired degree of tension. This might be due to shrinkage or stretching of the blanket 30 or to some other cause. Whatever the cause, the tension may be easily and quickly adjusted. The net 32 is simply slid off of at least some of the pins 20, and the tension on the net 32 is either increased or decreased as required. Then the net 32 is slid back onto each of the pins 20 from which it has been removed with each of such pins finally extending through a different one of the holes 38.

When the blanket 30 has been secured and the desired degree of tension has been obtained, the composite material may be compacted. This is accomplished by applying a vacuum between the blanket 30 and the work surface 8. The vacuum may be applied in any of a number of known ways. For example, the work surface 8 may be porous and the vacuum may be applied through such surface 8. FIG. 3 illustrates in exaggerated form the pores 42 in the surface 8. FIGS. 3 and 4 illustrate the vacuum bagging operation as the blanket 30 is being pulled downwardly by the vacuum.

When the compacting is completed, the vacuum is removed. Then the blanket 30 may be detached from the structure 2 and lifted away from the surface 8. The lay-up and compacting procedures are then repeated as necessary.

It will be obvious to those skilled in the art to which this invention is addressed that the invention may be used to advantage in a variety of situations. Therefore, it is also to be understood by those skilled in the art that various changes, modifications, and omissions in form and detail may be made without departing from the spirit and scope of the present invention as defined by the following claims.

What is claimed is:

1. In a system having an essentially rigid structure which includes a work surface, a flexible blanket, means for creating a pressure differential to urge said flexible blanket against a workpiece positioned on said surface, the improvement comprising attaching means for removably securing the blanket over said surface; said attaching means comprising a strip of flexible sheet-like material secured to the blanket around the periphery of the blanket, said material having a multiplicity of holes extending therethrough, and a plurality of pins secured to said structure, said pins being positioned to engage said holes to removably secure the blanket in position over said surface.

2. The system described in claim 1, in which said holes and said pins are positioned to allow each of said pins to engage any one of a plurality of said holes to in turn allow tension on the blanket to be adjusted.

3. The system described in claim 2, in which said strip of material comprises a strip of net-like material.

4. The system described in claim 1, in which said material is secured to the blanket by adhesive means.

5. The system described in claim 4, in which the blanket comprises silicone rubber, and the adhesive means comprises a silicone rubber adhesive.

6. The system described in claim 4, in which the adhesive means comprises two layers of adhesive around the periphery of the blanket adjacent to the edges of the blanket, an edge portion of said material is secured between said two layers, and one of said layers is wider than the other to reduce stresses on the blanket adjacent to said layers.

7. The system described in claim 5, in which the silicone rubber adhesive includes two layers of such adhesive around the periphery of the blanket adjacent to the edges of the blanket, an edge portion of said material is secured between said two layers, and one of said layers is wider than the other to reduce stresses on the blanket adjacent to said layers.

8. The system described in claim 5, in which said strip of material comprises a strip of net-like material.

9. The system described in claim 7, in which said strip of material comprises a strip of net-like material.

10. In combination:
   an essentially rigid structure including a work surface;
   a flexible blanket;
   pressure means for creating a pressure differential from one side of the blanket to the other to urge the blanket against a workpiece positioned on said surface; and
   the improvement comprising attaching means for removably securing the blanket in position over said surface; said attaching means including a strip of flexible sheet-like material secured to the blanket around the periphery of the blanket, said material having a multiplicity of holes extending therethrough, and a plurality of pins secured to said structure, said pins being positioned to engage said holes to removably secure the blanket over said surface.

11. The combination of claim 10, in which the pressure means includes a seal carried by said structure surrounding said surface, and the blanket is dimensioned to cover said surface and engage said seal.

12. The combination of claim 10, in which said holes and said pins are positioned to allow each of said pins to engage any one of a plurality of said holes to in turn allow tension on the blanket to be adjusted.

13. The combination of claim 12, in which said strip of material comprises a strip of net-like material.

14. The combination of claim 10, in which the blanket comprises silicone rubber, and said material is secured to the blanket by silicone rubber adhesive.

15. The combination of claim 14, in which the silicone rubber adhesive includes two layers of such adhesive around the periphery of the blanket adjacent to the edges of the blanket, an edge portion of said material is secured between said two layers, and one of said layers is wider than the other to reduce stresses on the blanket adjacent to said layers.

16. The combination of claim 14, in which said strip of material comprises a strip of net-like material.

17. The combination of claim 15, in which said strip of material comprises a strip of net-like material.

18. A method of removably securing a flexible blanket in position over a work surface of an essentially rigid structure in a system having means for creating a pressure differential for urging the blanket against a workpiece positioned on said surface, said method comprising:
   securing a strip of flexible sheet-like material having a multiplicity of holes extending therethrough to the blanket around the periphery of the blanket;
   securing one end of each of a plurality of pins to said structure, and positioning said pins to engage said holes;
   placing the blanket over said surface; and
   pulling the material over the other end of each pin to extend said other end through one of said holes to removably secure the blanket over said surface.

19. A method as described in claim 18, further comprising adjusting the tension on the blanket by sliding said material off of at least some of said pins, and then extending said other end of each pin from which the material has been removed through a different one of said holes.

* * * * *